United States Patent
Williams

[15] 3,677,301
[45] July 18, 1972

[54] PLASTIC PIPE FITTING AND CLOSURE

[72] Inventor: Robert M. Williams, Davison, Mich.

[73] Assignee: Genova Products, Davidson, Mich.

[22] Filed: April 21, 1970

[21] Appl. No.: 30,433

[52] U.S. Cl..................................138/92, 138/89, 220/40, 138/96
[51] Int. Cl.........................................................F16l 55/10
[58] Field of Search.....................138/92, 89, 96; 220/40

[56] References Cited

UNITED STATES PATENTS

| | | | |
|---|---|---|---|
| 3,148,708 | 9/1964 | Panella | 138/89 |
| 2,145,077 | 1/1939 | Farr | 220/40 |
| 3,065,767 | 11/1962 | Topf | 138/89 |
| 2,356,987 | 8/1944 | Gallap | 138/89 |
| 3,148,798 | 9/1964 | Brown | 138/89 X |
| 2,607,045 | 8/1952 | Morris | 138/89 X |
| 1,592,382 | 7/1926 | Munn | 138/89 |
| 1,884,165 | 10/1932 | Otis | 138/89 X |
| 3,401,842 | 9/1968 | Morrison | 220/40 X |

FOREIGN PATENTS OR APPLICATIONS 707,570 4/1954 Great Britain..........................138/89

*Primary Examiner*—Herbert F. Ross
*Attorney*—Olsen and Stephenson

[57] ABSTRACT

A cleanout for a plastic pipe system which includes a threadless socket and a threadless plug fitted in sealing relation in said socket and interconnected to prevent internal forces from displacing the plug. The socket and plug can be utilized in a pipe system for other purposes than that of a cleanout.

2 Claims, 5 Drawing Figures

PATENTED JUL 18 1972

3,677,301

INVENTOR
ROBERT M. WILLIAMS

BY

*Olsen and Stephenson*
ATTORNEYS

PLASTIC PIPE FITTING AND CLOSURE

BACKGROUND OF THE INVENTION

The present invention relates to organic plastic pipe systems, and particularly to an access fitting and closure for the system. It has been conventional practice in pipe fittings, whether metal or plastic, to provide an internally threaded fitting and an externally threaded plug when it has been desirable or necessary to provide access to the system for cleanouts, pressure testing, or the like. This has been especially true in drain, waste and vent applications. Such access fittings normally require threaded sealants to assure proper sealing of the system from the environment, and also require tools for removing and reinstalling the plugs.

SUMMARY OF THE INVENTION

The present invention has overcome certain shortcomings of the prior art, and has provided an access fitting and closure which are especially adapted for use in organic plastic pipe systems. The invention involves the use of an unthreaded locking plug fitted into an unthreaded socket which opens to the interior of the pipe system. An appropriate sealing ring encircles the plug to provide an effective seal between the plug and the socket. Also, suitable interlocking elements are carried by the plug and the socket so that after the plug is inserted in place, it can be turned to a locked position which will prevent displacement of the plug by internal forces from within the system.

According to one form of the present invention a threadless socket is provided having a cylindrical internal bore. A threadless cylindrical plug is inserted into the bore, said plug having an annular groove in its outer cylindrical surface in which a sealing ring is seated in sealing engagement with the internal bore of the socket. The socket has a locking lug projecting radially outwardly from its outer surface, and the plug has a lug retainer projecting radially outwardly from its outer surface and then projecting axially rearward beyond the locking lug. The retainer has in its axially directed portion a circumferentially directed slot which is open at one end to receive the lug when the plug is turned in its inserted position relative to the socket.

Thus, it is an object of the present invention to provide an improved access fitting and closure for a plastic pipe system.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Figure 1:
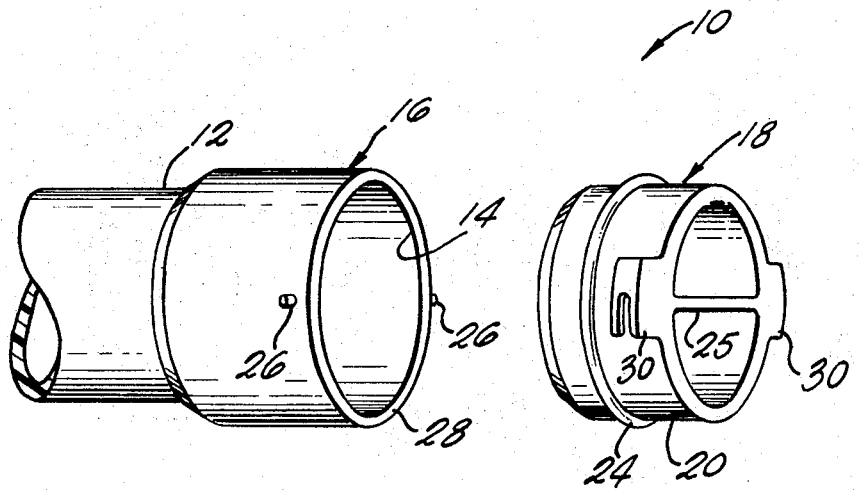
FIG. 1 is an exploded view of an access fitting and closure embodying the present invention.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The cleanout fitting and closure 10 includes a segment of a plastic pipe 12 having at its end a threadless cylindrical bore 14 defining a socket 16 having an inner beveled seat 17, and a plastic threadless plug 18 having a cylindrical portion 20 closed at its inner end 21 and beveled so that the inner end 21 can fit against the beveled seat 17. The cylindrical surface 20 has an annular groove 22 therein in which is seated a sealing element 24, preferably a resilient O-ring. A diametral flange 25 extends the length of the plug 18 to rigidify the same and, if desired, for turning the plug.

Figure 2:
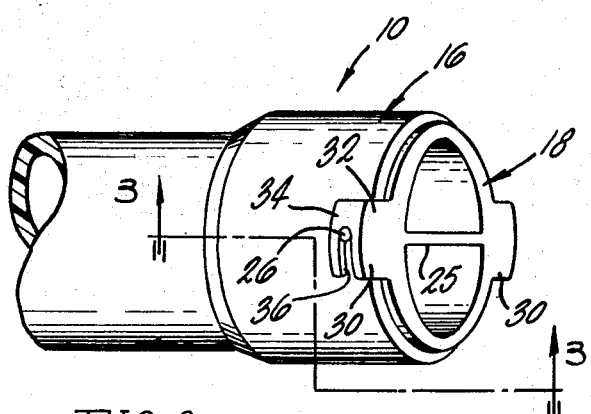
FIG. 2 is a perspective view, similar to that of FIG. 1, but showing the access fitting and closure in assembled position.
Figure 3:
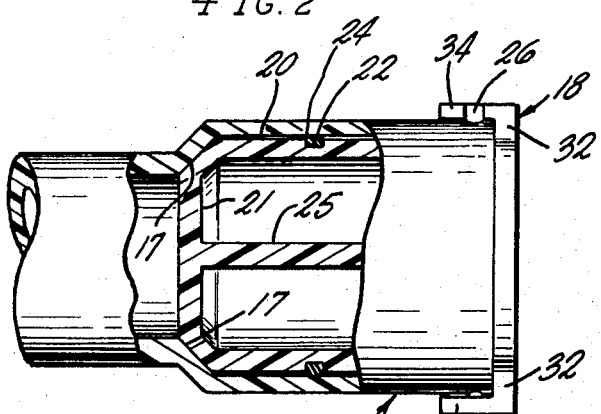
FIG. 3 is a fragmentary section taken on the lines 3—3 of FIG. 2.

The socket 16 has a pair of diametrically opposed, radially outwardly projecting lugs 26 located adjacent to the outer end 28. The plug 18 has a pair of diametrically opposite, radially outwardly projecting lug retainers 30 including a first radially outwardly projecting portion 32 which is adapted to seat on the end 28 of the socket 16, and an axially projecting portion 34 which extends axially inwardly so as to overlie the outer surface of the socket 16. Each axially extending portion 34 includes a slot 36 which opens in a generally circumferential direction to receive a lug 26 after the plug 18 has been pressed in place in seated relation in the socket 16 and turned relative to the socket 16. By virtue of this arrangement, the plug 18 can be fitted into the socket 16 and can be turned relative thereto to the position shown in FIG. 2, whereby internal pressures will be unable to dislodge the plug 18. As shown best in FIG. 3, when the plug 18 is in its inserted position, the O-ring 24 will be in sealing engagement with the inner cylindrical surface of the socket 16 so that an effective seal is provided.

When it is desired to remove the plug from the socket 16, this can readily be accomplished merely by manually engaging the lug retainers 30 or the diametral flange 25 and turning the plug 18 relative to the socket 16 until the lugs 26 are free from being enclosed by the slot 36, and the plug 18 can then be pulled from the socket 16 merely by pulling on the retainers 30. Thus, an improved and simple fitting and closure 19 has been provided which will enable easy access to be had to the interior of the pipe system, and wherein such access can be gained without the need of special tools for removing the plug. Also, when the plug is in place a very effective seal is provided.

Figure 4:
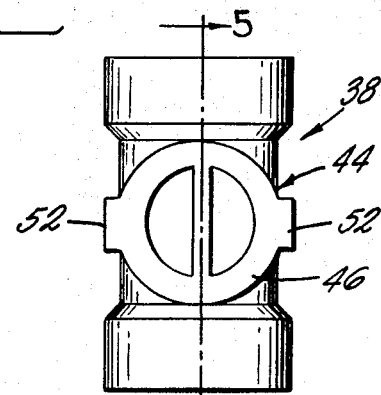
FIG. 4 is a front elevational view of an access tee-fitting embodying the present invention.
Figure 5:
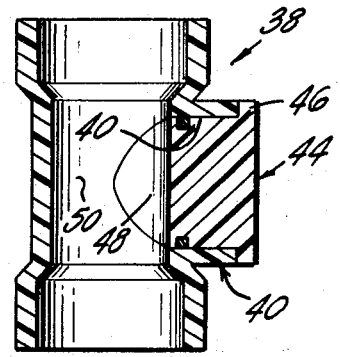
FIG. 5 is a sectional view taken on the lines 5—5 of FIG. 4.

As shown in FIGS. 4 and 5, the present invention can be embodied in other types of fittings. As there shown, the invention is embodied in a tee-fitting 38 which has a threadless cylindrical bore 40 defining a socket 42 in which is secured a threadless plug 44. The plug 44 is essentially the same as the plug 18, except that the plug 44 has an annular lip 46 which is seated on the outer end of the pipe segment or socket 40, and in addition, plug 44 has a contour to its closed inner end 48 which conforms to the cylindrical surface 50 defining the passageway through fitting 38. Thus, the plug 44 assures a smooth continuous flow passageway through fitting 38, and the lug retainers 52, when in interlocking engagement with the lugs (not shown) will assure that the surface 48 is properly oriented relative to the surface 50 to provide such smooth continuous flow passageway.

It is claimed:

1. In a plastic piping system, a threadless socket having a cylindrical internal bore, a threadless tubular cylindrical plug inserted into said bore, and having a closed inner end and a diametral reinforcing flange integral with the inner end and extending the length of the plug, said plug having an annular groove in its outer cylindrical surface, a sealing ring in said groove in sealing engagement with said internal bore, said socket having a locking lug projecting radially outward from its outer surface, and said plug having a lug retainer projecting radially outwardly beyond said outer surface of the socket and axially beyond said locking lug, said retainer having in its axially directed portion a circumferentially directed slot which is open at one end to receive said lug when said lug is turned in its inserted position relative to said socket, said socket being the stem portion of a tee-fitting having a passageway therethrough, and said plug has a closed inner end conforming to the shape of the inner surface of the passageway through the fitting when the plug is in its retained position.

2. The combination of a pipe fitting and a closure plug for a piping system, said fitting having a through-passageway and a laterally directed socket defining a threadless cylindrical bore in communication with said passageway, said closure plug having a cylindrical portion extending into said cylindrical bore in sealing relationship, the outer end of said plug having at least one projection extending over a portion of the outer surface of said socket, means on the outer surface of said socket interlocked with said projection to prevent axial outward movement of the plug and to position the plug radially when said means and said projection are interlocked, said plug having a closed inner end conforming to the shape of the inner surface of the through-passageway when the plug is in its interlocked position so that a smooth continuous wall surface is provided in said through-passageway.

* * * * *